United States Patent Office 3,160,140
Patented Dec. 8, 1964

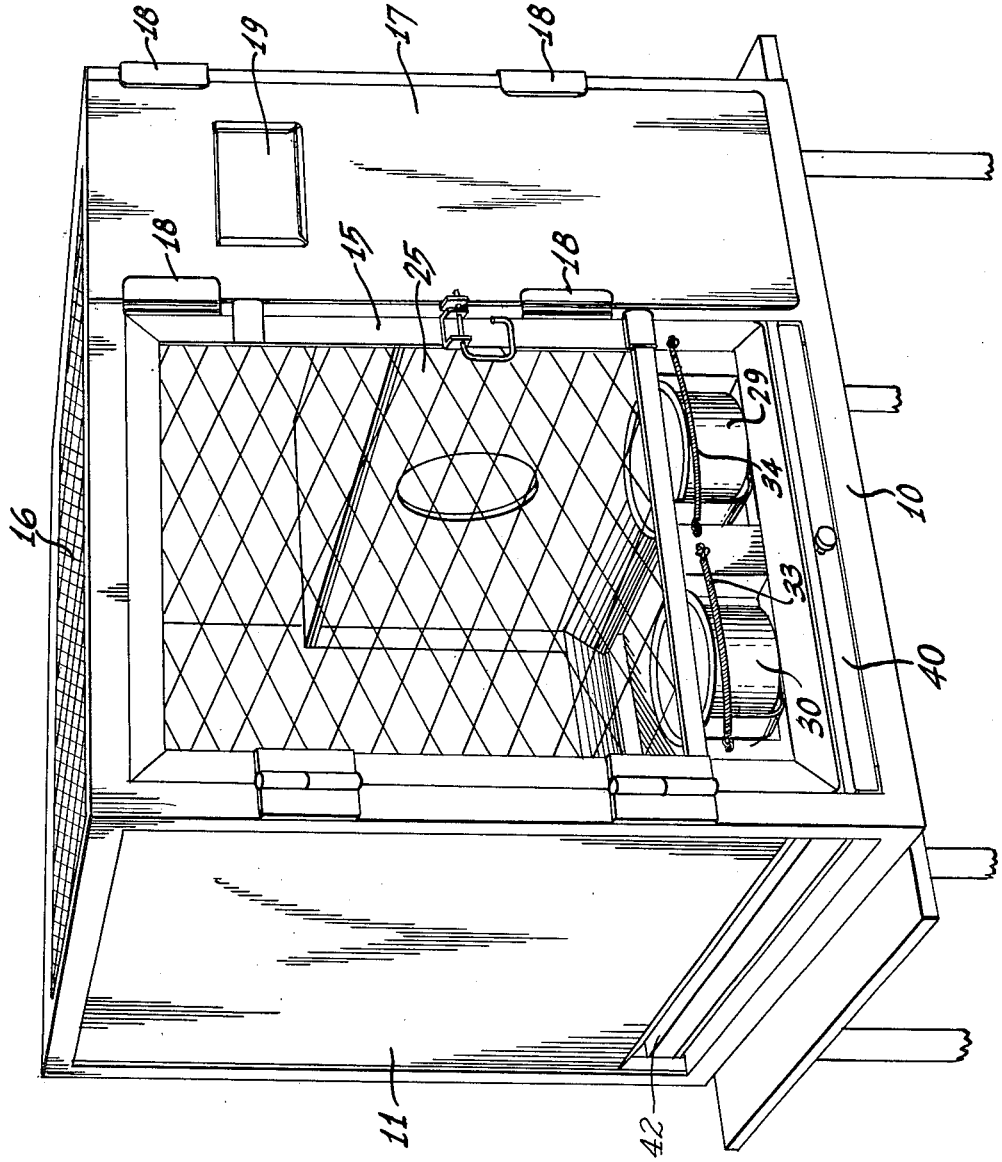

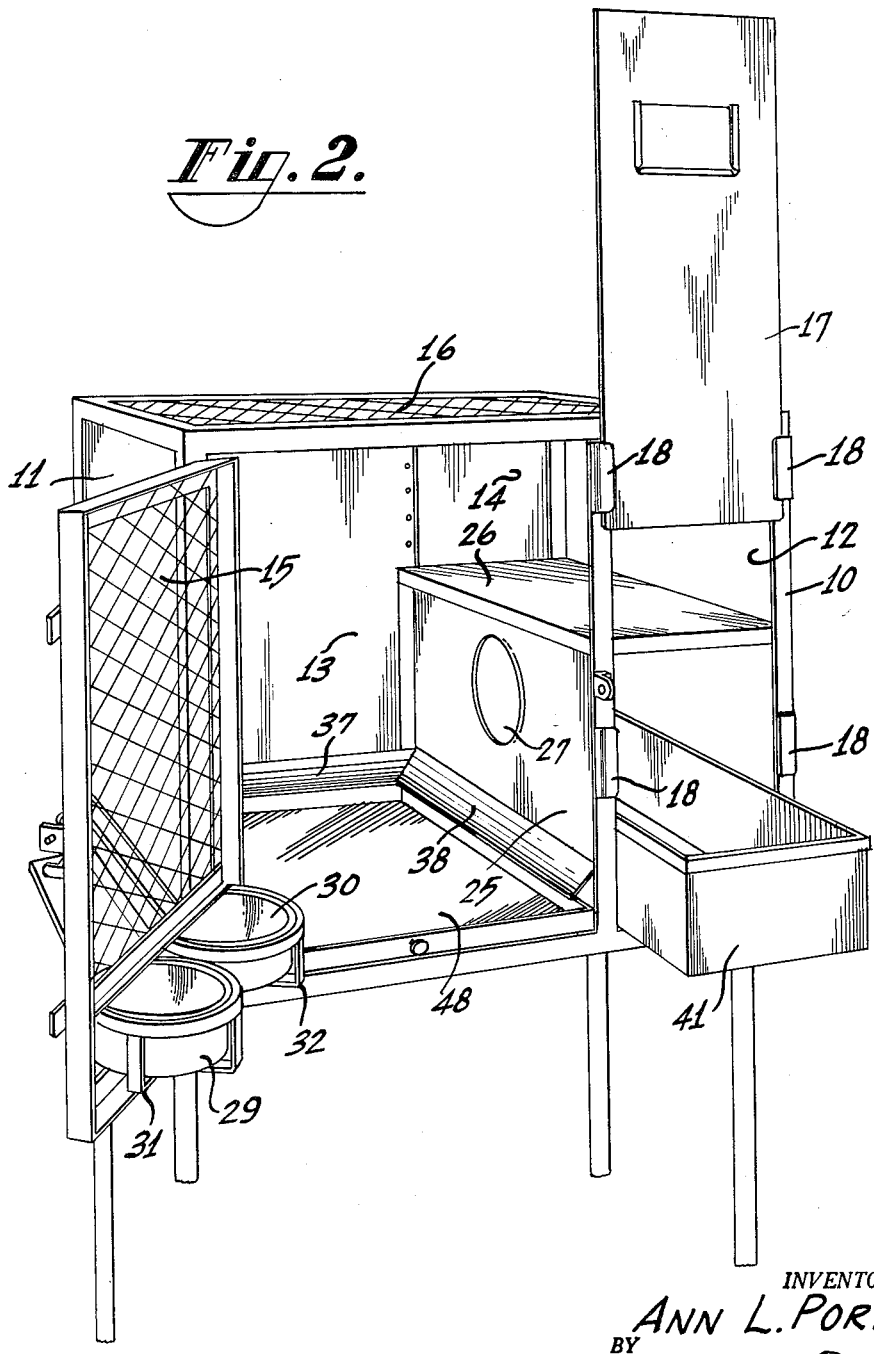

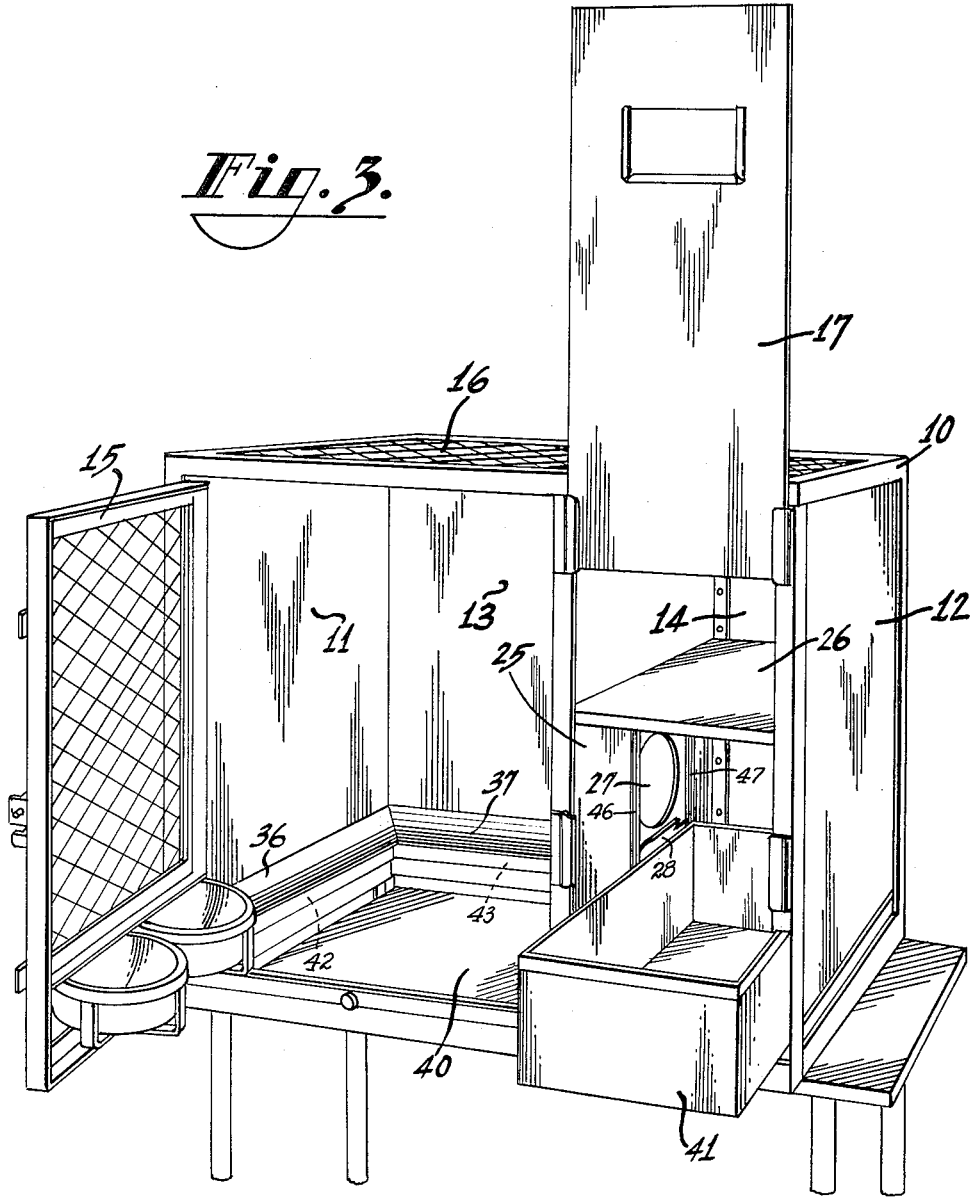

3,160,140
ANIMAL CAGE
Ann L. Porter, Princeton, N.J., assignor to Porter-Mathews Company, Inc., a corporation of New Jersey
Continuation of application Ser. No. 131,586, Aug. 15, 1961. This application July 12, 1963, Ser. No. 295,599
13 Claims. (Cl. 119—18)

This invention relates to a cage particularly useful for kennels and laboratories and more particularly intended for use for cats.

The present application is a continuation of my pending application, Serial No. 131,586, filed August 15, 1961, now abandoned, for an improvement in an animal cage.

One of the problems in caging cats is to provide sufficiently large living quarters as well as service quarters occupying a minimum of space and to provide an area where the animal may rest.

A further problem is to provide means permitting access to either of the quarters while at the same time preventing escape of the animal.

Other problems involve preventing food and other matter from being discharged from the bottom of the cage by the animal. It is also desirable to provide means for permitting food containers to be removed and replaced without opening the cage. Proper ventilation is another desirable feature but it is also necessary to insure that contamination between cages is reduced to a minimum.

It is therefore an object of my invention to provide a cage of simple and rugged construction which provides the maximum room for living quarters and which utilizes the minimum of space for service quarters.

A further object of my invention is to provide such a cage in which access to elements such as feeding bowls and cleanout drawers or trays can be had without the necessity of completely opening the cage in the process.

A further object of my invention is to provide such a cage which, in addition to providing a desirable sleeping area, is a part of the outside of the service area thus utilizing space to a maximum.

A still further object of my invention is to provide a cage which has means for preventing food and other matter from being discharged from the bottom of the cage.

A further object of my invention is to provide a cage which, while providing the maximum of ventilation, provides protection against contamination between cages.

Briefly, in accordance with my invention, I provide a rectangularly shaped box-like cage in which the service quarters occupy a minimum of space and comprises a partition having an opening for access between service and living quarters as well as a top shelf which encloses the service quarters and also provides a sleeping area for the animal. One part of the living quarters is closed by an open mesh door which removably supports one or more feeding bowls which can be removed without opening the door. The other portion of the cage is closed by means of a sliding panel which when partially raised will maintain the living quarters of the cage closed but permit removal of the drawer in the service compartment. The bottom of the cage is open along two sides sufficiently to permit ventilation and is provided with deflectors around the lower perimeter to prevent discharge of food and other matter from the cage. The ventilation openings are below the deflectors.

In the drawings:

FIG. 1 is a perspective of the cage assembly in closed position;

FIG. 2 is a left-hand perspective of the cage drawn on a reduced scale with doors open as viewed from the left-hand side; and FIG. 3 is a perspective of the cage drawn on a reduced scale with doors open as viewed from the right-hand side.

Referring to the drawings, the cage comprises a frame 10 closed at the sides and rear by means of panels 11, 12, 13 and 14. The front of the cage is closed by means of door 15 having an extruded mesh thereacross. The right-hand portion of the cage is closed by means of the sliding panel 17 received within slide guides and supports 18. Panel 17 and supports 18 have a frictional relationship permitting selective positioning of the sliding panel or door 17. The panel 17 may be provided with a card holder 19 for identification purposes.

The cage is designed and constructed to have two compartments. One compartment provides the living quarters and the other compartment provides the service quarters. The service quarters are formed by means of a partition 25 and a shelf 26 which may be made of wood or other like material. The partition 25 is provided with an opening 27 through which the animal may pass between the two quarters. The opening 27 may be closed by means of the sliding closure member 28 mounted in and having frictional engagement with guides or tracks 46 and 47 when it is desired to separate the two compartments for cleaning or other purposes.

Removably mounted on the door 15 are supporting brackets or frames 31 and 32 for supporting the feeding and watering bowls or receptacles 29 and 30 which are removably retained in place by means of spring members 33 and 34. This permits removal of bowls without opening the door.

Deflectors 36, 37 and 38 are provided at the bottom of panels 11, 13 and partition 25 for deflecting food and other material into the shelf or drawer 40. The bottom of the panels 11, 13 are spaced from the bottom of the cage and are tilted inwardly to provide openings 42 and 43 for ventilation and to prevent food and other matter from being thrown from the cage. Shelf 40 may be removed without opening any of the doors.

In addition to drawer 40, a second drawer 41 is provided in the service quarters and is removable for cleaning purposes.

The above-described construction provides maximum living quarters for the animal which is caged and also provides a sleeping area while at the same time utilizing the minimum of space for service quarters. More room for living activities of animals, particularly cats, encourages them to feed properly. The slide in the opening to the service quarters makes it possible to confine the animal to either compartment when it is desired to open the other compartment. The advantage of the slide door at the right is that it is possible to confine the animal to the cage while permitting access to either one or both of the drawers. Thus, it is possible to remove the drawers as well as the feeding bowls while still confining the animal to the cage. While the cage is designed particularly for cats, it can, of course, be used for other types of animals. The construction is simple and inexpensive.

What is claimed is:

1. A cage including a rectangular shaped box-like cage divided into two compartments providing a living quarters and a service quarters, said service quarters including a compartment having an opening on one side communicating with said living quarters, said service compartment having a top providing a shelf, the area above said shelf being in open communication with said living quarters and providing an elevated resting place, a slidable drawer slidably mounted in said service compartment, a slidable door slidably mounted on one side of said cage for closing the service compartment and the space above the service compartment, means on said cage frictionally engaging said slidable door, to permit eslective positioning of said slidable door, a door for closing the rest of the front of said cage, a feeding bowl mounted on said last door, said living quarters having a slidable shelf mounted at the bottom thereof and removable without opening said last door.

2. A cage including a rectangularly shaped box-like cage divided into two compartments providing a living quarters and a service quarters, said service quarters including a side panel having an opening providing communication between the service quarters and the living quarters, said service quarters being closed at the top by a sleeping shelf, the area above said shelf being in open communication with said living quarters and providing an elevated resting place, the service compartment occupying only a corner of said cage, a slidable drawer slidably mounted in said service compartment, a slidable door slidably mounted at one side of said cage for closing the service compartment and the space above said service compartment, means on said cage frictionally engaging said slidable door, to permit selective positioning of said slidable door, a door for closing the front of the rest of said cage, a removable feeding bowl mounted on said last door, said living quarters having a slidable shelf mounted at the bottom thereof and removable without opening said last door.

3. A cage including a rectangularly shaped box-like cage divided into two compartments providing a living quarters and a service quarters, said service quarters including a side panel having an opening for communication between said service quarters and said living quarters, said service compartment having a top providing a sleeping shelf, the area above said shelf being in open communication with said living quarters and providing an elevated retsing place, a slidable drawer slidably mounted in said service compartment, a slidable door slidably mounted at one side of said cage for closing the service compartment and the space above said service compartment, means on said cage frictionally engaging said slidable door, to permit selective positioning of said slidable door, the service compartment occuppying only a corner of said cage, a door for closing the rest of said cage, removable feeding bowls mounted on said last door and removable without opening said door, said living quarters having a slidable shelf mounted at the bottom thereof and removable without opening said last door, and a slide for closing the opening in said panel.

4. A cage including a rectangularly shaped box-like cage divided into two compartments providing a living quarters and a service quarters, said service quarters including a compartment having an opening on one side communicating with said living quarters, said service compartment having a top providing a sleeping shelf, the area above said shelf being in open communication with said living quarters and providing an elevated resting place, a slidable drawer slidably mounted in said service compartment, a slidable door slidably mounted at one side of said cage for closing the service compartment and the space above said service compartment, means on said cage frictionally engaging said slidable door, to permit selective positioning of said slidable door, a door for closing the rest of said cage, said living quarters having a slidable shelf mounted at the bottom thereof and removable without opening said door, the front and top of said cage being of mesh material and the sides and back being of solid panels.

5. A cage including a rectangularly shaped box-like cage divided into two camporatments providing a living quarters and service quarters, said service quarters including a compartment having an opening on one side communicating with said living quarters, said service compartment having a top providing a sleeping shelf, the area above said shelf being in open communication with said living quarters and providing an elevated resting place, a slidable drawer slidably mounted in said service compartment, a vertically slidable door slidably mounted at one side of said cage for closing the service compartment and the space above the shelf of said service compartment, means on said cage frictionally engaging said slidable door to permit selective positioning of said slidable door, a door for closing the rest of said cage, said living quarters having a slidable shelf mounted at the bottom thereof and removable without opening said last door, the front and top of said cage being of mesh material and the sides and back being of solid panels, one side panel and part of the back panel terminating short of the bottom of the cage to provide ventilating openings and inwardly extending deflectors fastened at their tops to a side panel, back panel and one side of said service compartment adjacent the bottom of said cage.

6. A cage including a rectangularly shaped box-like cage divided into two compartments providing a living quarters and a service quarters, said service quarters including a compartment having an opening on one side communicating with said living quarters, said service compartment having a top providing a sleeping shelf, the area above said shelf being in open communication with said living quarters and providing an elevated resting place, a slidable drawer slidably mounted in said service compartment, a vertically slidable door slidably mounted at one side of said cage for closing the service compartment and the space above said service compartment, means on said cage frictionally engaging said slidable door to permit selective positioning of said slidable door, a door for closing the rest of said cage, said living quarters having a slidables helf mounted at the bottom thereof and removable without opening said last door, the front and top of said cage being of mesh material and the sides and back being of solid panels.

7. A cage including a rectangularly shaped box-like cage divided into two compartments providing a living quarters and a service quarters, said service quarters including a compartment having an opening on one side communicating with said living quarters, said service compartment having a top providing a sleeping shelf, the area above said shelf being in open communication with said living quarters and providing an elevated resting place, a slidable drawer slidably mounted in said service compartment, a vertically slidable door slidably mounted at one side of said cage for closing the service compartment and the space above said service compartment, means on said cage frictionally engaging said slidable door to permit selective positioning of said slidable door, a door for closing the rest of said cage, said living quarters having a slidable shelf mounted at the bottom thereof and removable without opening said last door, the front and top of said cage being of mesh material and the sides and back being of solid panels, said service compartment including a part of one side panel and a part of the bottom of the cage and occupying one corner of said cage.

8. A cage including a rectangularly shaped box-like cage divided into two compartments providing a living quarters and a service quarters, said service quarters including a compartment having an opening on one side communicating with said living quarters, said service compartment having a top providing a sleeping shelf, the area above said shelf being in open communication with said living quarters and providing an elevated resting place, a slidable drawer slidably mounted in said service compartment, a slidable door slidably mounted at one side of said cage for closing the service compartment and the space above said service compartment, means on said cage frictionally engaging said slidable door to permit selective positioning of said slidable door, a door for closing the rest of said cage, said living quarters having a slidable shelf mounted at the bottom thereof and removable without opening said last door, said last door and top of said cage being of mesh material and the sides and back being of solid panels, one of said panels and a part of said back panel terminating short of the bottom of said cage to provide ventilating openings, and deflectors at the bottom of said living quarters, the lower ends of which are spaced from the bottom of the cage.

9. A cage including a rectangularly shaped box-like cage divided into two compartments providing a living quarters and a service quarters, said service quarters including a compartment having an opening on one side communicating with said living quarters, said service compartment having a top providing a sleeping shelf, the area above said shelf being in open communication with said living quarters and providing an elevated resting place, a slidable drawer slidably mounted in the bottom of said service compartment, a vertically slidable door slidably mounted at one side of said cage for closing the service compartment and the space above said service compartment, slide guide means on said cage frictionally engaging said slidable door to permit selective positioning of said slidable door, a door for closing the rest of said cage, said living quarters having a slidable shelf mounted at the bottom thereof and removable without opening said door, said last door and top of said cage being of mesh material and the sides and back being of solid panels, one of said panels and a part of said back panel terminating short of the bottom of said cage to provide ventilating openings, and deflectors at the bottom of said living quarters, the lower ends of which are spaced from the bottom of the cage.

10. A cage including a rectangularly shaped box-like cage divided into two compartments providing a living quarters and a service quarters, said service quarters including a side panel having an opening therein to provide communication between said service quarters and said living quarters, the service compartment having a top providing a sleeping shelf, the area above said shelf being in open communication with said living quarters and providing an elevated resting place, a slidable drawer slidably mounted in the bottom of said service compartment, a slidable door slidably mounted at one side of said cage for closing the service compartment and the space above said service compartment, slide guide means on said cage frictionally engaging said slidable door to permit selective positioning of said slidable door, a door for closing the rest of said cage, said living quarters having a slidable shelf mounted at the bottom thereof and removable without opening said door, said last door and top of said cage being of mesh material and the sides and back being of solid panels, one of said panels and a part of said back panel terminating short of the bottom of said cage to provide ventilating openings, and deflectors at the bottom of said living quarters, the lower ends of which are spaced from the bottom of the cage, and a sliding door for the opening in the side panel of compartment providing the service quarters.

11. A cage including a rectangularly shaped box-like cage divided into two compartments providing a living quarters and a service quarters, said service quarters including a side panel having an opening therein to provide communication between said service quarters and said living quarters, the service compartment having a top providing a sleeping shelf, the area above said shelf being in open communication with said living quarters and providing an elevated resting place, a slidable drawer slidably mounted in the bottom of said service compartment, a slidable door slidably mounted at one side of said cage for closing the service compartment and the space above said service compartment means on said cage frictionally engaging said slidable door to permit selective positioning of said slidable door, said slidable door providing means for maintaining the space above the sleeping shelf closed while permitting the service compartment to be opened while cleaning the service compartment, a door for closing the rest of said cage, said living quarters having a slidable shelf mounted at the bottom thereof and removable without opening said door, said last door and top of said cage being of mesh material and the sides and back being of solid panels, one of said panels and a part of said back panel terminating short of the bottom of said cage to provide ventilating openings, and deflectors at the bottom of said living quarters, the lower ends of which are spaced from the bottom of the cage, and a sliding door for the opening in the side panel of said compartment providing the service quarters.

12. A cage including a rectangularly shaped box-like cage divided into two compartments providing a living quarters and a service quarters, said service quarters including a side panel having an opening therein to provide communication between said service quarters and said living quarters, the service compartment having a top providing a sleeping shelf, the area above said shelf being in open communication with said living quarters and providing an elevated resting place, a slidable drawer slidably mounted in the bottom of said service compartment, a slidable door slidably mounted at one side of said cage for closing the service compartment and the space above said service compartment, slide guide means on said tube frictionally engaging said slidable door to permit selective positioning of said slidable door, said slidable door providing means for maintaining the space above the sleeping shelf closed while permitting the service compartment to be opened while cleaning the service compartment, a door for closing the rest of said cage, said living quarters having a slidable shelf mounted at the bottom thereof and removable without opening said door, said last door and top of said cage being of mesh material and the sides and back being of solid panels, one of said panels and a part of said back panel extending from said service compartment to the panel spaced from said service compartment terminating short of the bottom of said cage to provide ventilating openings, and deflectors at the bottom of said living quarters, the lower ends of which are spaced from the bottom of the cage, and a sliding door for the opening in the side panel of said compartment providing the service quarters.

13. A cage including a rectangularly shaped box-like cage divided into two compartments providing a living quarters and a service quarters, said service quarters including a side panel having an opening therein to provide communication between said service quarters and said living quarters, the service compartment having a top providing a sleeping shelf, the area above said shelf being in open communication with said living quarters and providing an elevated resting place, a slidable drawer slidably mounted in the bottom of said service compartment, a slidable door slidably mounted at one side of said cage for closing the service compartment and the space above said service compartment, means on said cage frictionally engaging said slidable door to permit selective positioning of said slidable door, said slidable door providing means for maintaining the space above the sleeping shelf closed while permitting the service compartment to be opened while cleaning the service compartment, a door for closing the rest of said cage, said living quarters having a slidable shelf mounted at the bottom thereof and removable without opening said door, said last door and top of said cage being of mesh material and the sides and back being of solid panels, one of said panels and a part of said back panel extending from said service compartment to the panel spaced from said service compartment terminating short of the bottom of said cage to provide ventilating openings, and deflectors at the bottom of said living quarters, the lower ends of which are spaced from the bottom of the cage, and a sliding door for the opening in the side panel of said compartment providing the service quarters, the door closing the rest of the cage having an elongated opening therein, supporting brackets extending inwardly of said last door adjacent said opening for receiving removable containers, and resilient means extending across said opening for engaging and retaining said containers on said supporting brackets whereby said containers may be readily removed and replaced.

(References on following page)

References Cited by the Examiner

UNITED STATES PATENTS

| | | | |
|---|---|---|---|
| 1,719,769 | 7/29 | Kaufman | 119—18 |
| 1,878,459 | 9/32 | Bliss et al. | 119—18 |
| 2,026,334 | 12/35 | Wilkinson | 119—19 |
| 2,567,664 | 9/51 | Ewell | 119—21 |
| 2,653,569 | 9/53 | Forester | 119—18 |
| 2,655,129 | 10/53 | Miller | 119—17 |
| 2,932,279 | 4/60 | Giles | 119—15 |

SAMUEL KOREN, *Primary Examiner.*
ALDRICH F. MEDBERY, *Examiner.*